US005774661A

United States Patent [19]
Chatterjee et al.

[11] Patent Number: 5,774,661
[45] Date of Patent: Jun. 30, 1998

[54] RULE ENGINE INTERFACE FOR A VISUAL WORKFLOW BUILDER

[75] Inventors: Surajit Chatterjee, Falls Church; Man-Hon Edwin Leong, Reston; Scott M. Schneider, Centerville, all of Va.

[73] Assignee: Network Imaging Corporation, Herndon, Va.

[21] Appl. No.: 423,972

[22] Filed: Apr. 18, 1995

[51] Int. Cl.[6] .................................................. G06F 15/16
[52] U.S. Cl. ................................. 395/200.33; 395/200.68
[58] Field of Search ............................... 364/401 R, 402, 364/406; 382/305, 306; 395/12, 62, 155, 157, 159, 161, 162, 200.01, 200.02, 200.03, 200.05, 200.08, 200.09, 200.1, 200.11, 200.12, 200.15, 600, 201, 202, 203, 208, 211, 200.33, 200.68

[56] References Cited

U.S. PATENT DOCUMENTS

| | | | |
|---|---|---|---|
| 5,054,096 | 10/1991 | Beizer ....................................... | 382/305 |
| 5,301,320 | 4/1994 | McAtee et al. .......................... | 395/600 |
| 5,319,543 | 6/1994 | Wilhelm ............................... | 364/401 R |
| 5,398,336 | 3/1995 | Tantry et al. ............................. | 395/600 |
| 5,446,740 | 8/1995 | Yien et al. ............................... | 370/110.1 |
| 5,491,800 | 2/1996 | Goldsmith et al. ................. | 395/200.12 |
| 5,517,663 | 5/1996 | Kahn ........................................ | 395/800 |
| 5,535,322 | 7/1996 | Hecht ...................................... | 395/155 |

OTHER PUBLICATIONS

Dialog Abstract: File 751, Acc# 00280016; OmniDesk 2.1 PC Version; Sigma Imaging Systems, Inc.; First Installed: 1989.

Zimmerman; "Open Systems for Imaging Touted as Standards Spread at AIIM"; *MIS Week*; v11 n16; p12(1); Apr. 16, 1990; Dialog: File 275, Acc# 01360950.

Dyson; "Anatomy of Groupware"; *RELease 1.0*; v92 n8; p1(6); Aug. 31, 1992; Dialog: File 275, Acc# 01534264.

"USA: Recognition Announces Plexus Floware Software for Univel Unixware"; *Businesswire (BUSW)*; Apr. 6, 1993; Dialog: File 772, Acc# 10388051.

Karney; "Office.IQ"; *PC Magazine*; v12 n11; p291(3); Jun. 15, 1993; Dialog: File 275, Acc# 01599337.

Scheier; "OS/2 Software Builds Workflows Using Objects"; *PC Week*; v10 n38; p22(1); Sep. 27, 1993; Dialog: File 148, Acc# 06706810.

"Competitive Outlook: Image Management Development"; Datapro Information Services Group; Publication Date unspecified; Dialog: File 753; Acc# 00002263.

News Release; Dateline: New York, NY; Apr. 18, 1994; "Sigma Ships OmniDesk Version 2.21"; Dialog: File 621, Acc# 0487868.

Gustwick; "OPEN/Workflow Optimizes Business Process"; *RiSc World*; v4 n4; p18(1); Apr. 1994; Dialog: File 256, Acc# 00064188.

*Primary Examiner*—Gail O. Hayes
*Assistant Examiner*—Stephen R. Tkacs
*Attorney, Agent, or Firm*—Fenwick & West LLP

[57] ABSTRACT

A system and method for automatically generating and controlling workflows that include a number of processes uses a workflow server computer and a client computer coupled to the workflow server by a network. The workflow server computer has an object repository and a rule engine. The client computer has a workflow builder structure and a graphical user interface. The workflow builder structure includes a rule builder by which users can interactively construct rules for a workflow.

6 Claims, 5 Drawing Sheets

RULE ENGINE INTERFACE FOR A VISUAL WORKFLOW BUILDER

37 C.F.R. 1.71 AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office records, but otherwise reserves all copyright rights whatsoever.

BACKGROUND OF THE INVENTION

This invention relates generally to computer systems for automating workflows, and specifically to systems and methods for controlling diverse applications in a workflow without custom programming through a user interface.

Numerous schemes have been proposed to automate the processing and management of routine tasks, such as occur in industry, government, and educational environments. Early attempts at such automation included the application of mathematical programming techniques to resource allocation during World War II, the use of punched cards for maintaining employee and inventory data, and the advent of electronic mail systems. Through such techniques, concepts such as "just-in-time" inventory control and critical task analysis became ever more practical for implementation in a variety of environments.

Later systems were more comprehensive. Electronic data interchange, for example, provided a system whereby entire commercial transactions could be concluded using interconnected data processing equipment. Even more far-reaching were proposals for "paperless" offices in which documents of all sorts could be generated, processed, transmitted, and stored electronically.

The benefits of such systems were particularly apparent in situations where groups of people, rather than individuals, were working on the task to which the automation related. Thus, the terms "workgroup management" and "groupware" came to be used in connection with such automation. A more general term, "workflow automation" has come into use to describe the use of networked computers to route documents, schedule tasks, and perform other routine processes.

Typical systems for automating workflows, known as workflow builders, provide interaction among selected general purpose applications that may be used in a workflow. For example, a workflow builder may call upon an optical character recognition program to determine the contents of an image file, e.g., a customer name or purchase amount from an image of a customer invoice. The workflow builder may then call upon a database management system program to determine whether the customer name already exists in the database and, if not, to store it. Furthermore, the workflow builder may route information pertinent to this invoice to one type of further processing if a purchase amount is below a predetermined threshold, and may route it to another type of further processing if the amount is above the threshold.

One drawback of such known systems is that custom programming is required to coordinate the desired operation of the workflow builder with the other applications for which interaction in the workflow is desired. For instance, in some such systems, a programmer must write a custom "wrapper" application to invoke an application programming interface ("API") whenever access to an external application is desired. Accordingly, such systems are not easily created or modified by unsophisticated users, but instead are typically hand-crafted by programmers or skilled systems analysts.

Thus, known systems for automating workflows are somewhat constrained in the manner that they may be altered to meet new requirements and the benefits they can provide.

It would be desirable to have a system and method that is flexible enough to automate a variety of tasks, as well as to allow managers and other users who are not computer programmers to control, manage, and track the execution of such tasks.

None of the known solutions adequately addresses the need for such a simple, flexible, inexpensive system and method.

SUMMARY OF THE INVENTION

In accordance with the present invention, a system for automatically generating and controlling workflows includes a workflow server computer with an object repository and a rule engine, and a client computer with a workflow builder structure and a graphical user interface, wherein the workflow builder structure generates workflows that include steps for routing objects retrieved from the object repository in response to user control of the graphical user interface, and wherein the rule engine evaluates and routes these objects.

In one aspect of the invention, a workflow network communications structure is configured to transmit and receive signals between the client and server computers.

In another aspect of the invention, the workflow builder structure includes a rule builder for constructing workflow rules in response to user commands.

DETAILED DESCRIPTION OF THE DRAWINGS

The figures depict a preferred embodiment of the present invention for purposes of illustration only. One skilled in the art will readily recognize from the following discussion that alternative embodiments of the structures and methods illustrated herein may be employed without departing from the principles of the invention described herein.

Figure 1:
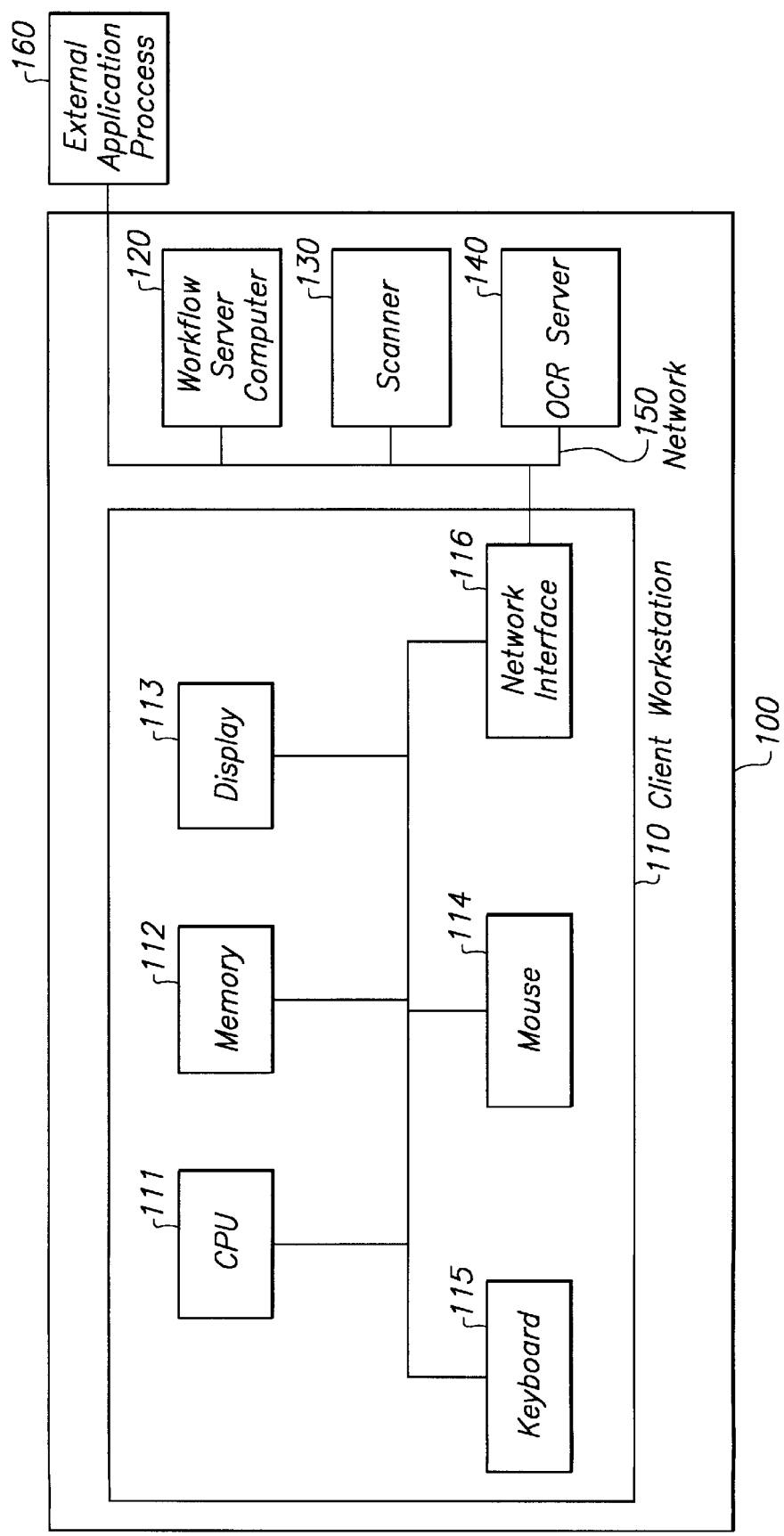
FIG. 1 is a structural block diagram of the components of a workflow automation system, in accordance with the present invention.

Referring now to FIG. 1, there is shown a system 100 for generating and controlling automated workflows in accordance with the present invention. The major components of system 100 include client workstation 110, workflow server computer 120, and network 150. In the embodiment shown in FIG. 1, system 100 also includes scanner 130 and optical character recognition (OCR) server 140. In overview, system 100 is used to generate and control automated workflows that call upon a variety of application processes, with a user of client workstation 110 building visual representations of such workflows and determining rules by which such workflows are implemented. For example, in the embodiment illustrated in FIG. 1, a workflow may involve scanning a customer purchase order document using scanner 130, determining certain data associated with that document using OCR server 140, and processing other data associated with that document in response to rules set by a user of client workstation 110. The processing of such other data is user-configurable to be implemented by workflow server computer 120 or by client workstation 110. It should be recognized that although FIG. 1 illustrates only a single client workstation, system 100 may be implemented with numerous client workstations as is done in known client/server computer systems.

Client workstation 110 includes a CPU 111, memory structure 112, display device 113, keyboard 115, mouse 114, and network interface 116. In a preferred embodiment, client workstation is implemented by a conventional microcomputer operating in a graphical environment, specifically a 80486 microprocessor-based computer operating in the WINDOWS environment. Accordingly, in a preferred embodiment CPU 111 is a conventional 80486-type microprocessor, memory 112 is implemented by a conventional structure of RAM and ROM devices, display 113 is a cathode-ray tube or equivalent computer display monitor, keyboard 115 and mouse 114 are conventional input devices, and network interface 116 is an ethernet network interface circuit. By program instructions stored in memory 112, such a conventional hardware configuration forms a client workstation 110 and performs in the manner as detailed below.

In the embodiment illustrated in FIG. 1, workflow server computer 120 is a programmed conventional UNIX-based server-class computer, scanner 130 is a conventional digital scanner, and OCR server 140 is a server-class computer conventionally programmed for dedicated use in optical character recognition tasks. In an alternate embodiment, OCR server 140 may physically be implemented using workflow server computer 120.

Figure 2:
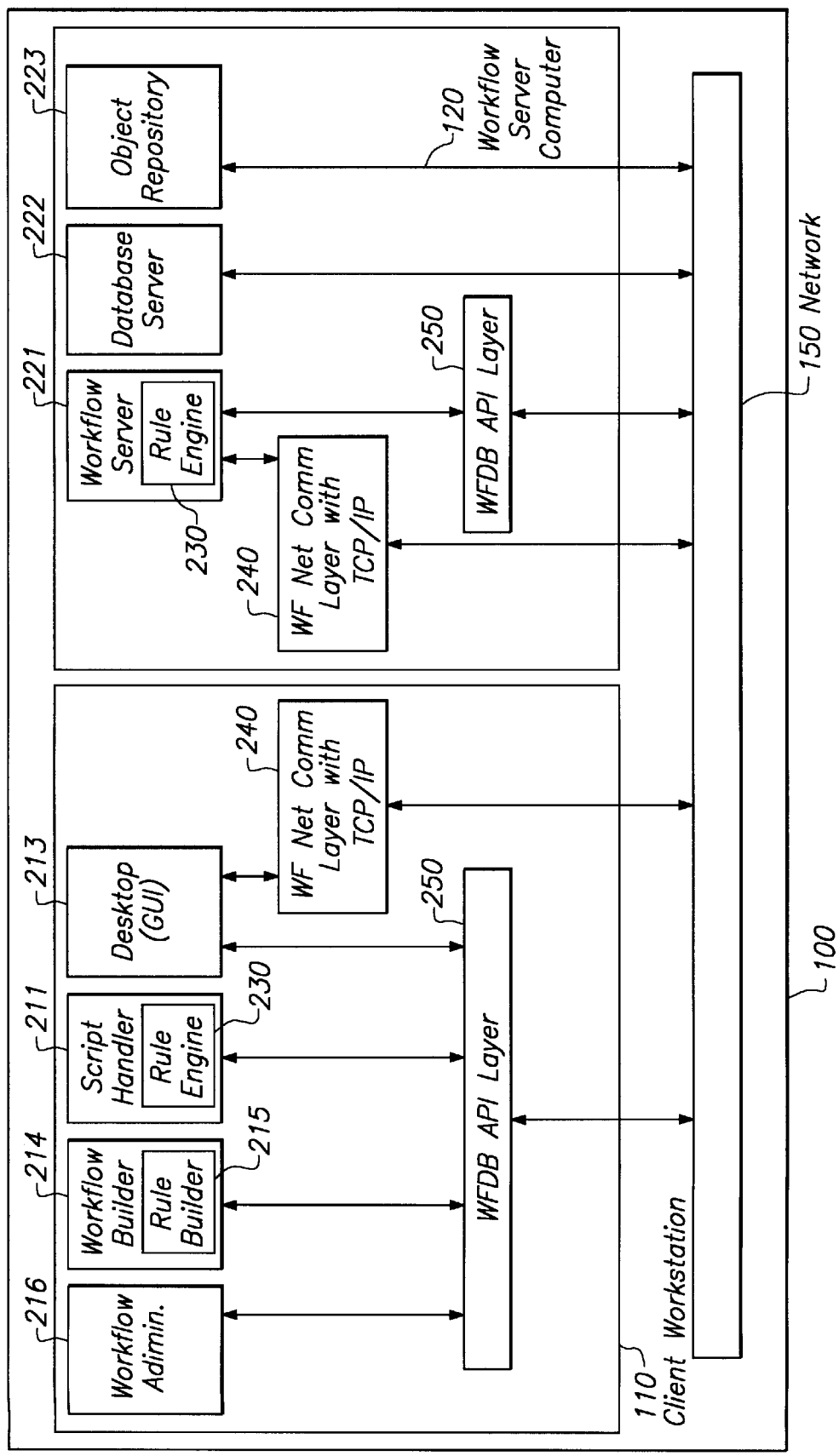
FIG. 2 is a diagram illustrating network structures for communications among the component structures of the system shown in FIG. 1.

Referring now to FIG. 2, the subsystems provided by programming of client workstation 110 and workflow server computer 120 are illustrated, as are the connections between such structures and network 150. The subsystems of client workstation 110 illustrated in FIG. 2 include a script handler 211 incorporating a rule engine 230, a desktop subsystem 213 providing a graphical user interface, a workflow builder 214 incorporating a rule builder structure 215, and a workflow administrator 216.

Workflow administrator 216 is a subsystem that sets up users, objects, tasks (or "workbaskets"), and performs other conventional system administration operations. Workflow administrator 216 also provides process definitions or "operations" and other building blocks for workflow builder 214. Selection of such defined operations may then be made by a user, for instance as discussed in connection with icon 381 illustrated in FIG. 3.

Workflow builder 214 is a subsystem that generates links or "maps" to define the steps, rules, and operations of a workflow, as desired by a user of client workstation 110. For example, an object may be an image of a customer purchase order obtained by a scanning step in a workflow; a second step may cause optical character recognition of that object. One of the components of workflow builder 214 is rule builder 215, which permits a user of client workstation 110 to define relationships among steps in a workflow in a graphical manner, as illustrated and described in greater detail below.

Desktop subsystem 213 provides a graphical human-machine interface environment for a user of client workstation 110 to implement workflows created by workflow builder 214 and signals script handler 211 to begin automating individual workflow steps. Script handler 211 is responsible for reading the rules that have been defined for the specified workflow, obtaining the data needed for processing of the workflow, creating files as needed for processing, and initiates actual processing in accordance with the specified workflow step. Upon obtaining intermediate results calling for further user intervention, script handler signals desktop subsystem 213 to prompt the user for the necessary input.

One aspect of workflow processing supported by system 100 is control of application processes that are external to system 100. These application processes may be varied in nature. For example, one such external application process 160 would be to transmit data and control signals to an external device to perform optical character recognition on a stored image file. Another possible such external application process 160 would be to transmit data and control signals to cause an external database management system to search for a name and, if found, return a customer identification number to system 100 for further use. Yet another possible external application process 160 might involve signaling an automated heating system to warm up a portion of a manufacturing facility in response to a determination that an early production shift will be needed to meet current demand for a product, as indicated by purchase orders previously processed by a workflow being implemented using system 100.

In order to provide an interface between system 100 and such external application processes 160, script handler 211 generates control signals for such processes in response to workflow requirements. Script handler 211 automatically translates generalized rules for control of external application processes 160, provided by workflow administrator 216 and workflow builder 214, into specific commands that can be used to control the external application processes 160. For example, workflow administrator 216 and workflow builder 214 provide a general rule "store data" for providing data to an external application process. A user of client workstation 110 need only specify the "store data" rule and a target object (that represents an external application process 160), and script handler 211 determines the precise signal that is required to implement that request, in a manner that is understandable by external application process 160. Script handler 211 also performs conditional routing in complex operations once the conditions of those operations are evaluated by rule engine 230.

As shown in FIG. 2, some of the aforementioned subsystems communicate directly with network 150. However, by adding additional layers between these subsystems and network 150, certain advantages are obtained. Specifically, a workflow database (WFDB) API layer 250 is interposed between network 150 and subsystems 213–217. WFDB API layer 250 provides a common language for database request signals to or from these subsystems, and avoids the need for such signals to be in the format of any particular subsystem. For example, some of the subsystems connected to network 150 may operate in a native language known as SQL while others may operate in the C programming language; WFDB API layer permits communication among such different subsystems by translating from any such native language to a common language such as SQL. In practice, it is advantageous to have such a structure for mapping commands between the C language and SQL because, among other reasons, C programmers writing commands for subsystems implemented in the C language typically are not conversant in SQL.

Similarly, a workflow network communications layer 240 under the TCP/IP protocol is interposed between network 150 and desktop subsystem 213, as well as between network 150 and workflow server software structure 221. This signal path is used for communicating data related to routing requests between desktop subsystem 213 and workflow server software structure 221.

Turning now to the subsystems of workflow server computer 120, workflow server software structure 221 routes objects in a workflow as directed by workflow builder 214, for instance by routing an object to the appropriate next step of a workflow by passing corresponding data to or from database server 222. Rule engine 230 within workflow server software structure 221 evaluates routing paths that are called for by a workflow. Specifically, upon obtaining a request for processing, workflow server software structure 221 verifies the validity of the request by signaling an inquiry to database server 222 and, if the request is valid (i.e., the resource required to process the request is available), routes the request to be processed.

Database server 222 maintains a listing of internal and external resources available for processing requests by any of the other subsystems, as well as the status of such resources (e.g., idle or busy). Database server 222 also maintains information concerning the current status of objects in a workflow.

In a preferred embodiment, subsystems 211, 213–217 are implemented by program instructions stored in memory 112 of client workstation 110. Subsystems 221–223 are implemented by program instructions stored in a similar memory structure of workflow server computer 120. Subsystems 230, 240, and 250 are implemented fully in both client workstation 110 and workflow server computer 120, again by program instructions stored in the respective memory structures of those devices.

Figure 3:
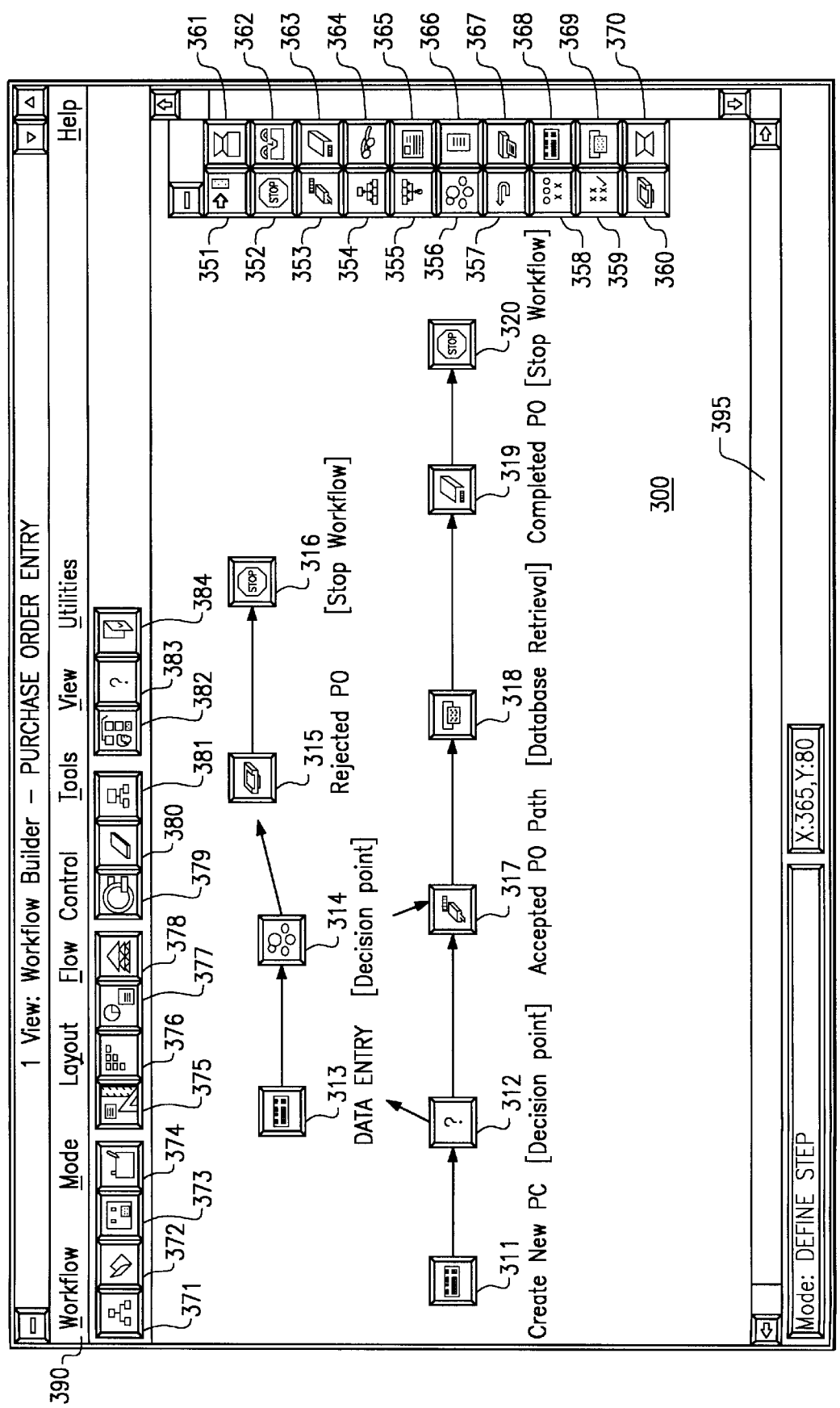
FIG. 3 illustrates a user interface for a workflow builder in accordance with the present invention.

Referring now to FIG. 3, there is shown a workflow builder display 300 implemented on a conventional window 395 of display 113. Workflow builder display 300 includes a menu bar 390 to permit user selection of various operations for the construction of a workflow. The Workflow menu header of menu bar 390 permits selection of several menus: Workflow, Mode, Layout, Flow Control, Tools, View, and Utilities.

The Workflow menu is used to set up, define, and verify new workflows. The choices in the workflow menu are Login, Logoff, New, Open, Close, Save, Save As, Delete, Import, Export, Print, Printer Setup, Options, Define, Verify, and Exit. Login and Logoff are used to connect a new user to system 100, to access a different server within system 100, or to disconnect certain users or servers without leaving system 100 entirely. New is used to create a new workflow or operation. Open and close are used to control access to existing workflows, for instance to view or modify such workflows. Save, Save As, Delete, Import, and Export allow a user to store, remove, or add workflows. Print allows a user to print a diagram of a current workflow, or the definitions and rules of a workflow. Printer Setup and Options are used to configure the system for the user's hardware and preferences. Define allows a user to assign security protection to a workflow, including a password, a security level, and encryption. Verify checks that all defined parts of a workflow exist in database server 222 and are compatible with one another, and records any errors in a verification log. Exit is used to leave system 100. As a convenience to the user, some of the menu choices described above are also accessible through iconic buttons. New is represented by button 371, Open by button 372, Save by button 373, Verify by button 374, and Exit by button 384.

The Mode menu allows the user to switch between laying out workflow steps and links and defining the operations and workbaskets associated with each step. It also permits the user to select various views pertaining to a workflow. The choices under the Mode menu are Layout Steps, Define Step, Step Summary, and Expand Workflow. Layout Steps, also accessible by button 375, places the display 113 in a Layout mode that allows user selection of operations and flow control points by clicking on appropriate operations buttons 351–370, individually described below. Specifically, a user clicks on one such operations button, e.g., 351, and drags it to a desired location using mouse 114. Links are similarly established among operations by manipulating mouse 114. Define Steps, also accessible by button 376, places the display 113 in a "define" mode in which specific operations, workbaskets, and so on are assigned to a workflow step, and rules used by a workflow decision point are defined. Step Summary, also accessible by button 377, places the display in a mode that provides information about a currently selected step. Expand Workflow, also accessible by button 378, places display 113 in a mode that displays the components of a step that is itself a complex operation, i.e., one that is a sub-workflow comprised of several constituent operations.

The Layout menu facilitates insertion and deletion of steps, flow control points, and links within a workflow. A Select Operation choice, also accessible by button 381, allows the user to choose an operation for a step from a list of previously-defined operations. A Link Steps choice, also accessible by button 379, place mouse 114 in a mode where steps or flow control points are linked together by clicking on one and dragging a connection line to the other. A Delete choice, also accessible by button 380, places mouse 114 in a mode in which steps, flow control points, and links are removed from a workflow by clicking on them. A Normal choice returns operation of mouse 114 to conventional point-and-click mode after it has been in the Link or Delete Modes. A Detour mode allows insertion of a "detour" path to or from a workbasket or operation that is temporarily unavailable.

The Flow Control menu provides for insertion of flow control points such as insertion, distribution, and decision, and allows selection of Item Entry, Workflow Stop, Distribution Flow Control, Connector, Decision, Broadcast, Workbasket, and Workflow/Complex Op. Item entry, also accessible by button 351, adds an insertion point to a workflow diagram and permits objects such as documents and spreadsheets to be inserted in a workflow. Workflow Stop, also accessible by button 352, inserts a stop point in a workflow. Distribution Flow Control permits insertion of a distribution point, also accessible by button 354, or a collection point, also accessible by button 355, into a workflow. Distribution points allow several users to work on an item in parallel, and collection points allow several items to follow a single path in a workflow. Connector, also accessible by button 353, inserts a connection point into a workflow diagram allowing two processing paths or routes to be merged into one. Decision, also accessible by button 356, inserts a decision point into a workflow that creates branches in a workflow path, flow among which is dependent upon information within an object or the results of previous processing. Broadcast, also accessible by button 359, inserts a broadcast point into a workflow, which is a type of stop point that allows a user to distribute objects for informational purposes after work on them is complete. Workbasket, also accessible by button 360, permits the insertion of a named workbasket into a workflow diagram. Workflow/ Complex Operation, also accessible by button 358, permits insertion of a sub-workflow or complex operation into a current workflow diagram. By defining subworkflows and complex operations, design of future workflows is simplified by re-use of such sub-workflows and complex operations. As used herein, a "complex operation" is implemented entirely on client workstation 110, while a "sub-workflow" may not be implemented entirely on client workstation 110.

The Tools menu permits selection of commonly used operations for insertion in a workflow, based on previously-created definitions. In a preferred embodiment, default operations provided in this menu include Scan, OCR, Index, Import/Export, Print, File/Archive, Data Entry/Forms, Database Retrieval, and Batch Process. Scan, also accessible by button 361, inserts a document scanning step in a workflow. OCR, also accessible by button 362, inserts a step that converts an image into editable text using optical character recognition (OCR). Index, also accessible by button 363, inserts a step that indexes files created by the OCR step. Import/Export, also accessible by button 365, permits importing objects to, and exporting objects from, workflows. Print, also accessible by button 367, inserts a printing step into a workflow. File/Archive, also accessible by button 366, inserts a step that moves an object into an archive location such as a computer output retrieval system. Data Entry/ Forms, also accessible by button 368, inserts a step that allows a user to type information into forms. Database Retrieval, also accessible by button 369, inserts a step allowing a user to specify a database to be used for storage and retrieval of information. Batch Process, also accessible by button 370, inserts a batch processing step.

"Return to" button 357 inserts a "return to" step that routes an object to a user who created that object. "View" button 364 inserts a "view" step that displays for a user an object routed to that view step in a workflow.

The View menu permits control of the appearance of display 113. A Tool Box selection permits display of icons 351–370 to be toggled on or off. A Tool Bar selection permits display of icons 371–384 to be toggled on or off. A Show All selection resizes the display of a current workflow so that all parts of it fit within a display window. A Grid selection toggles display of a grid for laying out a workflow, and Define Grid and Snap To Grid selections allow a user to determine grid size and whether parts of a workflow diagram will be placed in alignment with the grid.

The Utilities menu provides access to administrative facilities provided by workflow administrator 216.

Turning now to the example workflow of builder display 300, this workflow commences by data entry 311 for a new purchase order. Execution of "data frm entry" object 311 provides the user with a prompt to enter data. In this case, the data requested is purchase order data, defined using workflow administrator 216. Next, decision point 312 checks such data for certain properties, defined by the user in a manner described in connection with FIG. 4. As a result of this decision point 312, work flow processing will be routed either for further data entry 313 or to connection object "Accepted PO Path" 317. In the latter case, connection object "Accepted PO Path" 317 joins data from decision point 312 and decision point 314, database retrieval object 318 accesses a selected database and retrieves a specific record therefrom, and icons 319 and 320 indicate that the workflow is complete. Otherwise, data entry object 313 prompts the user for further input, decision point object 314 provides routing in response to the input data, and as a result the workflow either progresses to connection object Accepted PO Path317, indicating acceptance, or to work basket object 315, indicating rejection. In the latter event, work basket object 315 performs further processing, such as presenting a purchase order to a particular user as a rejected purchase order, at which point the work flow is complete, as indicated by icon 316.

Figure 4:
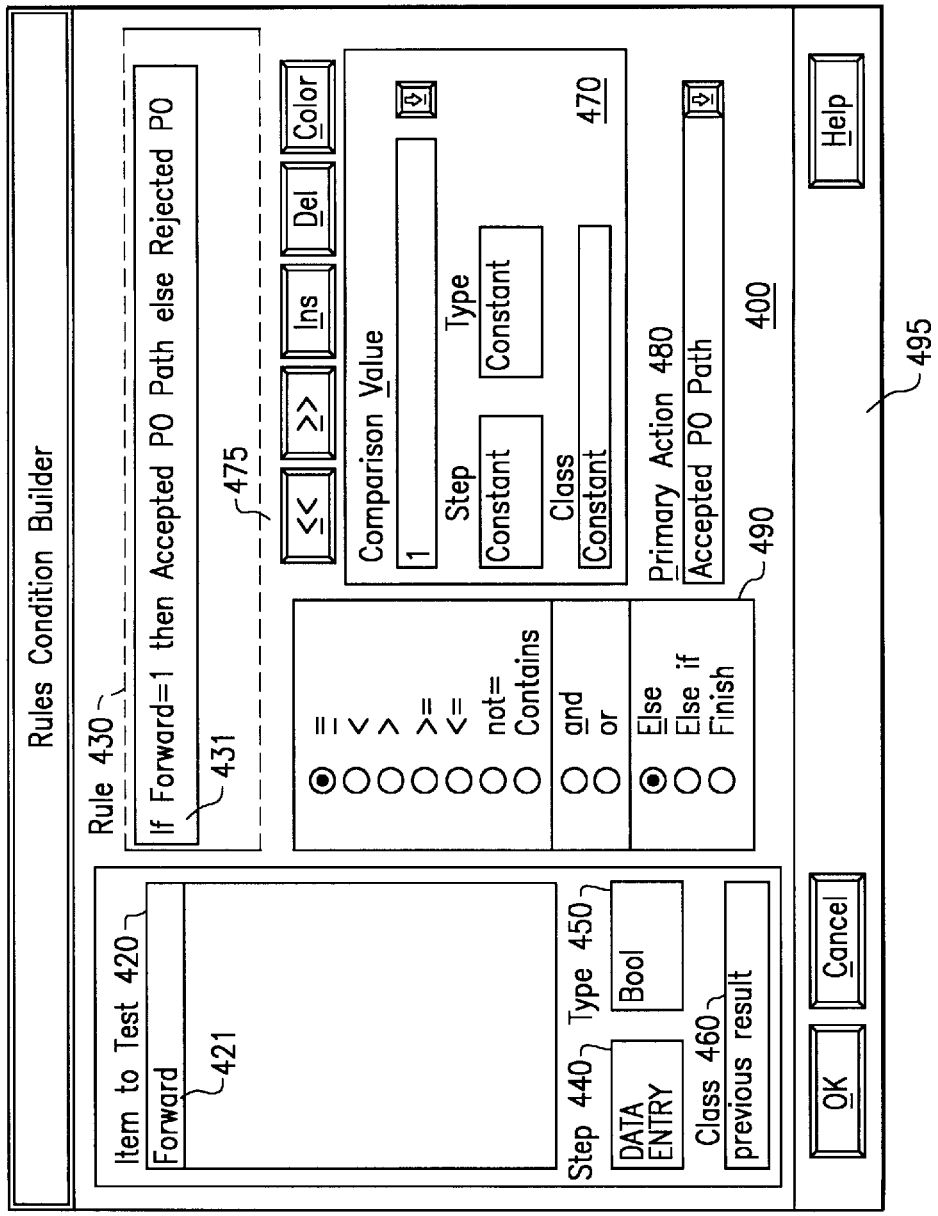
FIG. 4 illustrates a user interface for a rules builder in accordance with the present invention.

Referring now to FIG. 4, there is shown an example of a user interface "rule condition" display 400 provided by rule builder 215, illustrating how rules may be defined for use by rule engine 230. In operation, rule engine 230 evaluates complex Boolean expressions, taking as input parameters a clause list, a condition list, and a variable list. After making its evaluation, rule engine 230 provides as output the result of its evaluation. The following is an example of a rule:

if(x=2)or(x=4) then a
else if (y=3) then b
else c

A rule contains one or more clauses, which are evaluated and the correct result, or destination, is returned. The following are examples of clauses:

Example 1: if (x=2) or (x=4) then a
Example 2: else if (y=3) then b
Example 3: else c A clause contains one or more conditions, may include a connector (if, else if, else), and provides one result. The following are examples of conditions:

Example 1: (x=2) or
Example 2: (x=4)

A condition contains two arguments, which may be either variables or constants. A condition contains one comparison evaluator (equal to, not equal to, greater than, greater than equal to, less than, less than equal to, substring contains), and may include a conjunction (and, or, not, and not, or not).

A variable list contains a variable name and a value. Values are substituted into variables in arguments of conditions.

Rule engine 230 performs evaluations by first substituting values into variables, then evaluating each condition of a clause, determining a result for each such clause, and finally determining a result for the entire rule based on the results of the clauses.

Figure 5:
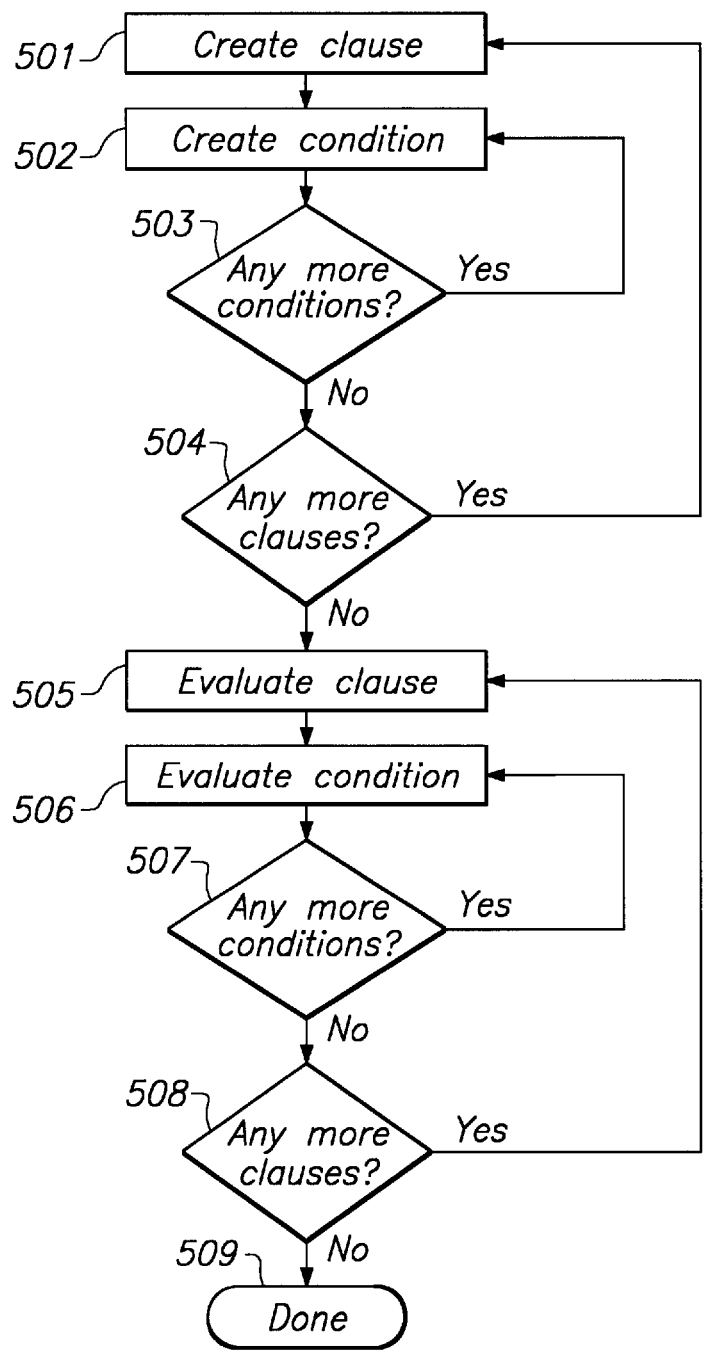
FIG. 5 is a flow diagram of rule engine processing in accordance with the present invention.

Referring now to FIG. 5, there is illustrated a flow diagram of processing by rule engine 230. Processing is commenced by rule engine 230 creating 501 a clause from the clause list presented to it. Next, rule engine 230 creates 502 a condition from the condition list presented to it. A check 503 is then made to see if there are more conditions in the condition list corresponding to the current clause. If so, rule engine 230 continues to create additional conditions until there are no more left to create. A check 504 is then made to see if there are more clauses in the clause list corresponding to the current rule. If so, engine 230 continues to create clauses (and associated conditions) as described above until all clauses for the rule have been created. At that point, rule engine 230 begins evaluating 505 the first clause. Rule engine 230 then evaluates 506 each condition, and a check 507 is made after each such evaluation to determine whether there are more conditions. When there are no more conditions for the current clause, a check 508 is made to determine whether there are more clauses. If so, processing returns to 505 for such additional clauses. After all clauses have been evaluated, processing is done 509, and the rule engine 230 presents as output the resulting routing information.

Rule condition display 400 is provided by rule builder 215 as a window 495 on display device 113. Rule condition display 400 includes an area 420 for identification of an object or "item" to test 421, an area 440 for the object name of the current step (e.g., DATA ENTRY) to be identified, an area 450 for the type of argument (e.g., Boolean) to be considered, and an area 460 for the class of the argument in the item to test.

Display 400 provides a rule summary box 430 for the user to build a rule for a current object. In the example of FIG. 4, the user has constructed the rule 431 that if the item "forward" is equal to 1, then the workflow proceeds along an "Accepted PO" path; otherwise, the workflow proceeds along a "Rejected PO" path.

Various buttons and controls 470, 475, 480, 490, are provided as prompts to assist the user in formulating such rules. In the specific embodiment illustrated in FIG. 4, buttons 475 include "<<" and ">>" controls to shift a "focus area" of rule 431 from one phrase in the rule to the next. In this embodiment, color highlighting is used to indicate the portion of rule 431 currently in the focus area. Buttons 475 also provide "Ins" and "Del" controls to insert a new clause at the focus area or delete the portion of rule 431 currently in the focus area, respectively. Buttons 475 further provide a "Color" control that changes the background and highlighting colors in rule summary box 430.

A Comparison Value interface box 470 provides the user with a way to enter values or variables to be used for comparison, and to specify related operand information, such as the step, type, and class of the comparison value. A conjunction/connector/comparison evaluator box 490 provides "radio button" interface selections for the conjunctions, connectors, and comparison evaluators described above. A Primary Action dialog box 480 allows selection of routing choices that will be available as rule results. In the case illustrated in FIG. 4, the Primary Action dialog box 480 displays "Accepted PO Path," which is the route that has been selected as the "then" result of rule 431. In a preferred embodiment, non-applicable controls, based on the syntax of the current rule, are grayed-out and disabled so that it is not possible to select such non-applicable controls.

In a preferred embodiment, the display 400 of FIG. 4 is implemented using standard Application Programming Interfaces provided for Microsoft WINDOWS 3.x. Pseudocode for one implementation of the display of FIG. 4, built on C++ and derived classes, is implemented using a conventional zApp™ 2.1 foundation class library available from Inmark Development Corporation, and is described as:

```
RuleBuildAPI(Arguments)
{
    Initialize(zApp);
    CreateWindow(zApp hidden frame window);
    Initialize(rule builder);
    GenerateRule(Arguments);
    GenerateDialogBox(rule builder);
    if(changes made)
        DecomposeRule(Arguments);
    return(changes made);
}
```

C++ class structures used for display 400 are a class FormatText, which generates rule syntax; a class RuleState, which maintains the current rule state; a class cBuildRule, which generates a rule; a class qeBuildr, which maintains rule structures internally; a class cDestination, which maintains the destination/action of a rule; a class zRulePane, which provides display of a rule in box 430; a class cRule, which represents the rule itself; a class cClause, which maintains the clauses of the rule; a class cCondition, which maintains the conditions of the rule; a class cArgument, which interprets argument types; a class cOperator, which interprets operator types; and a class cConjunc, which interprets conjunction types.

In a preferred embodiment, rule builder 215 is implemented as a static linked library, and is accessed through a single application programming interface call to the library. The application programming interface call includes arguments of several structure pointers, which are translated into an internal memory structure of rule builder 215 and initialize display 400.

When a rule has been constructed using display 400, application programming interface structures for the new rule are generated using information provided by the user through interaction with display 400. The following code portions, data structures, and application programming interface prototypes are used in implementing rule builder 215 in a preferred embodiment:

```
Syntax
    int WINAPI RuleBuildAPI(HWND hWnd,
            PDB_RULE *padbRule, short *psNumRule,
            PDB_CLAUSE *padbClause, short
                    *psNumClause,
            PDB_CONDITION *padbCondition, short
                    *psNumCondition,
            PDB_DESTINATION *padbDestination,
                    short *psNumDestination,
            PRULE_OPERAND paRuleOperand, short
                    sNumRuleOperand,
            PRULE_ACTION paRulePriAction, short
                    sNumRulePriAction,
            PRULE_ACTION paRuleSecAction, short
                    sNumRuleSecAction);
``` hWnd Window handle of the calling task.
padbRule Pointer to an array of DB_RULE structures
psNumRule Pointer to the number of DB_RULE structures in array
padbClause Pointer to an array of DB_CLAUSE structures
psNumClause Pointer to the number of DB_CLAUSE structures in array
padbCondition Pointer to an array of DB_CONDITION structures
psNumCondition Pointer to the number of DB_CONDITION structures in array
padbDestination Pointer to an array of DB_DESTINATION structures
psNumDestination Pointer to the number of DB_DESTINATION structures in array
paRuleOperand Pointer to an array of PRULE_OPERAND structures
sNumRuleOperand Number of PRULE_OPERAND structures in array
paRulePriAction Pointer to an array of PRULE_ACTION structures that contain primary action information
sNumRulePriAction Number of PRULE_ACTION structures in array
paRuleSecAction Pointer to an array of PRULE_ACTION structures that contain secondary action information
sNumRuleSecAction Number of PRULE_ACTION structures in array

Return

This API returns a non-zero short integer if a new rule is generated. Otherwise, 0 is returned.

Comments paRuleOperand points to an array to operands that will be used by the rule builder to generate comparison rules. The operands, on the other hand, will be evaluated by the rule engine. paRulePriAction points to an array of possible routing paths and paRuleSecAction points to an array of possible actions/services, secondary actions, which will be executed prior to the primary action taking place. The following data structures describe how the RULE_OPERAND and RULE_ACTION are used.

```
typedef struct {          // For Workflow Use Only:
    char cVarClass;       // Use DBV_SOURCE_XXXXX
    char cVarType;        // Use DBV_RESTYPE_XXXXX
    char szVarName[LEN_ARGNAME + 1];   // Result name etc.
                                       (szResultName)
    char szVarSrcName[LEN_STEPNAME + 1];  // Step Name etc.
                                          (szStepName)
    long lVarSrcId1;      // Workflow Id (lWorkflowId)
    long lVarSrcId2;      // Step Number (sStepNumber)
} RULE_OPERAND;
typedef struct {          // For Workflow Use Only:
    char szActionName[LEN_STEPNAME + 1];  // StepName
                                          (szStepName)
    long lActionId1;      // Workflow ID (lWorkflowId)
    long lActionId2;      // Step Number (sStepNumber)
} RULE_ACTION;
```

All PDB * arguments describe a rule. Users can prepopulate these structures prior to calling the API. If the PDB * arguments are provided, the rule builder will display the rule in its GUI. Upon returning from the API, all PDB * arguments may point to new array pointers which describe the new rule generated by the GUI. The following data structures describe how the PDB * arguments are related.

```
/****************************************************************
** Table Name: RULE
**
** Description: Stores the rules (header information) for a decision rule.
**
****************************************************************/
typedef struct {
    long lRuleId;                        /* id of rule */
    char szName[LEN_RULENAME+1];         /* name of rule/template
*/
    char szDesc[LEN_DESCRIP+1];     /* description of rule/template
*/
    DBOOL dTemplate;                     /* Is this a template? */
} DB_RULE;
/****************************************************************
**
** Table Name: CLAUSE
**
** Description: Stores the clauses associated with a rule.
**
****************************************************************/
typedef struct {
    long lRuleId;              /* id of rule */
    short sConstraintNumber;   /* order of constraint within a rule */
    short sClauseNumber;       /* order of clause within a
constraint */
    long lResultId;            /* destination for this clause, lResultID of
                                            DB_DESTINATION */
    char cConnector;           /* clause connector */
} DB_CLAUSE;
/****************************************************************
**
** Table Name: CONDITION
**
** Description: Stores the conditions associated with a clause.
**
** For workflow, lSourceId is used for the workflow id and
**                 lVarId is used for the step number.
****************************************************************/
typedef struct {
    long lRuleId;                /* id of rule*/
    short sConstraintNumber;     /* order of constraint within a rule*/
    short sClauseNumber;         /* order of clause within a
constraint*/
    short sConditionNumber;      /* order of condition within a clause*/
    char szName1[LEN_ARG+1];     /* name/value of variable 1 */
    char cVarType1;              /* type of variable 1 */
    DBOOL dLiteral1;             /* Is variable 1 a literal? */
    long lSourceId1;             /* application-defined source id */
    long lVarId1;                /* application-defined variable id */
    char cEvaluator;             /* comparison evaluator */
    char szName2[LEN_ARG+1];     /* name/value of variable 2 */
    char cVarType2;              /* type of variable 2 */
```

```
       DBOOL dLiteral2;           /* Is variable 2 a literal? */
       long lSourceId2;           /* application-defined source id */
       long lVarId2;              /* application-defined variable id */
       char cConjunction;         /* conjunction */
} DB_CONDITION;
/***************************************************************
* *
** Table Name: DESTINATION
* *
** Description: Lists the destinations that a rule can point to.
* *
***************************************************************/
typedef struct {
       long lResultId;            /* id of destination */
       long lWorkflowId;          /* id of workflow*/
       long lWfIdRev;             /* workflow revision */
       short sStepNumber;         /* step number in workflow */
       char szStepName[LEN_STEPNAME+1];  /* name of step */
       char szAction[LEN_STEPNAME+1];    /* name of action */
} DB_DESTINATION;
RULEBLD.H
/* Header file for Rule Builder */
// Prevent multiple include
#ifndef WINDOWS_H
#define WINDOWS_H
#include <windows.h>
#endif
#ifndef WFDB_H
#define WFDB_H
#include "wfdb.h"
#endif
// Define Rule Builder structures
typedef struct {            // For Workflow Use Only:
       char cVarClass;      // Use DBV_SOURCE_XXXXX
       char cVarType;       // Use DBV_RESTYPE_XXXXX
       char szVarName[LEN_ARGNAME + 1];     // Result name etc. (szResultName)
       char szVarSrcName[LEN_STEPNAME + 1]; // Step Name etc. (szStepName)
       long lVarSrcId1;     // Workflow Id (lWorkflowId)
       long lVarSrcId2;     // Step Number (sStepNumber)
       } RULE_OPERAND;
typedef RULE_OPERAND FAR *PRULE_OPERAND;
typedef struct {            // For Workflow Use Only:
       char szActionName[LEN_STEPNAME + 1]; // StepName (szStepName)
       long lActionId1;     // Workflow ID (lWorkflowId)
       long lActionId2;     // Step Number (sStepNumber)
       } RULE_ACTION;
typedef RULE_ACTION FAR *PRULE_ACTION;
// API Prototype
#ifndef ISLIBRARY
int WINAPI RuleBuildAPI(HWND hWnd, PDB_RULE *padbRule, short
                                *psNumRule,
          PDB_CLAUSE *padbClause, short *psNumClause,
          PDB_CONDITION *padbCondition, short *psNumCondition,
          PDB_DESTINATION *padbDestination, short *psNumDestination,
          PRULE_OPERAND paRuleOperand, short sNumRuleOperand,
          PRULE_ACTION paRulePriAction, short sNumRulePriAction,
          PRULE_ACTION paRuleSecAction, short sNumRuleSecAction);
#else
int WINAPI RuleBuildAPI(HINSTANCE hInst, HINSTANCE hPrev, LPSTR lpCmd,
          int CmdShow, HWND hWnd,
          PDB_RULE *padbRule, short *psNumRule,
          PDB_CLAUSE *padbClause, short *psNumClause,
          PDB_CONDITION *padbCondition, short *psNumCondition,
          PDB_DESTINATION *padbDestination, short *psNumDestination,
          PRULE_OPERAND paRuleOperand, short sNumRuleOperand,
          PRULE_ACTION paRulePriAction, short sNumRulePriAction,
          PRULE_ACTION paRuleSecAction, short sNumRuleSecAction);
#endif
```

Two particularly useful objects made available to an unsophisticated user through system 100 are decision point objects (e.g., object 312 in FIG. 3), which provide conditional branching to numerous workflow branches in response to characteristics of input information, and database access objects (e.g., object 318 in FIG. 3), which provide connection between a workflow and an external database. Conventionally, such objects were either extremely inflexible or required a trained programmer for customization of such objects to meet a particular user requirement. As illustrated in FIG. 4 above, rule builder 215 of system 100 permits an unsophisticated user of workstation 110 to create and modify complex conditional relationships without any such custom programming, and rule engine 230 automates workflow routing in accordance with such relationships.

From the above description, it will be apparent that the invention disclosed herein provides a novel and advantageous method and workflow system providing access to and control of various processes. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A system for automatically generating and controlling workflows including a plurality of workflow processes, the system comprising:

a server computer including an object repository and a first rule engine;

a client computer operatively coupled to the server computer, the client computer including a workflow builder structure, a graphical user interface, and a script handler in which a second rule engine is disposed, wherein the workflow builder structure generates workflows that include steps for routing objects retrieved from the object repository in response to user control of the graphical user interface, wherein said second rule engine evaluates said objects, and wherein the script handler processes said steps of said workflows and routes said objects.

2. A system as in claim 1, wherein ones of said steps correspond to ones of said workflow processes responsive to step performance by said server computer, and to external application processes responsive to step performance by said script handler.

3. A system as in claim 1, wherein said first rule engine and said second rule engine are identical.

4. A computer-implemented method of automatically generating and controlling workflows, the workflows including a plurality of processes, the method comprising:

generating, by a workflow builder structure of a client computer, a workflow that includes steps for routing objects retrieved from an object repository;

connecting said client computer to a server computer in which is disposed said object repository and a first rule engine;

routing said objects by said first rule engine to said client computer;

evaluating said objects by a second rule engine disposed in said client computer; and routing said objects by a script handler disposed in said client computer in response to the results of said evaluating.

5. A method as in claim 4, further comprising processing said steps by said script handler controlling at least one external application process.

6. A method as in claim 4, further comprising implementing said first rule engine and said second rule engine identically.

* * * * *